US008935926B2

(12) United States Patent
Wagner et al.

(10) Patent No.: US 8,935,926 B2
(45) Date of Patent: Jan. 20, 2015

(54) CENTRIFUGAL COMPRESSOR WITH BLEED FLOW SPLITTER FOR A GAS TURBINE ENGINE

(75) Inventors: Joel H. Wagner, Wethersfield, CT (US); Shankar S. Magge, S. Windsor, CT (US); Keith A. Santeler, Clifton Heights, PA (US)

(73) Assignee: United Technologies Corporation, Hartford, CT (US)

( * ) Notice: Subject to any disclaimer, the term of this patent is extended or adjusted under 35 U.S.C. 154(b) by 1030 days.

(21) Appl. No.: 12/914,947

(22) Filed: Oct. 28, 2010

(65) Prior Publication Data

US 2012/0102969 A1 May 3, 2012

(51) Int. Cl.

| | |
|---|---|
| ***F02C 6/04*** | (2006.01) |
| ***F02C 6/08*** | (2006.01) |
| ***F04D 29/28*** | (2006.01) |
| ***F04D 29/42*** | (2006.01) |
| *F02C 3/08* | (2006.01) |

(52) U.S. Cl.

CPC ................ *F02C 6/08* (2013.01); *F04D 29/284* (2013.01); *F04D 29/286* (2013.01); *F04D 29/4246* (2013.01); *F02C 3/08* (2013.01)

USPC ................. 60/785; 60/782; 60/795; 415/104; 415/106; 416/181

(58) Field of Classification Search

CPC ............. F01D 17/162; F02C 3/08; F02C 6/08

USPC ...................... 60/39.093, 785, 782, 795, 802; 415/144, 211.2, 104, 106; 416/183, 416/231 R, 181

See application file for complete search history.

(56) References Cited

U.S. PATENT DOCUMENTS

| | | | | |
|---|---|---|---|---|
| 700,224 | A * | 5/1902 | McRae | 415/174.1 |
| 815,439 | A * | 3/1906 | Krough | 277/500 |
| 1,020,699 | A * | 3/1912 | Kieser | 415/106 |
| 1,037,243 | A * | 9/1912 | Guy | 415/106 |
| 1,072,650 | A * | 9/1913 | Price | 415/201 |
| 1,095,394 | A * | 5/1914 | Goldman | 415/97 |
| 1,163,778 | A * | 12/1915 | Scheurmann | 415/140 |
| 1,238,731 | A * | 9/1917 | Anderson | 415/106 |
| 1,296,663 | A * | 3/1919 | Holden | 416/64 |
| 1,715,944 | A * | 6/1929 | Oliver | 277/558 |
| 1,901,154 | A * | 3/1933 | Durdin, Jr. | 417/72 |
| 2,374,671 | A * | 5/1945 | Dupont | 415/83 |
| 2,390,504 | A * | 12/1945 | Berger | 415/198.1 |
| 2,951,340 | A | 9/1960 | Howald | |
| 2,988,325 | A | 6/1961 | Dawson | |
| 3,068,646 | A * | 12/1962 | Fletcher | 60/226.2 |
| 3,179,328 | A * | 4/1965 | Pouit | 417/369 |
| 3,217,655 | A * | 11/1965 | Sercy et al. | 415/116 |
| 3,483,855 | A * | 12/1969 | Thoma | 123/381 |

(Continued)

FOREIGN PATENT DOCUMENTS

| | | |
|---|---|---|
| CA | 962601 | 2/1975 |
| DE | 659211 | 4/1938 |

(Continued)

*Primary Examiner* — William H Rodriguez
*Assistant Examiner* — Rene Ford
(74) *Attorney, Agent, or Firm* — Carlson, Gaskey & Olds, P.C.

(57) ABSTRACT

An impeller includes a plurality of vanes formed around a hub, each of the plurality of vanes defines an offset between a leading edge and a trailing edge.

6 Claims, 5 Drawing Sheets

48
54'
60
46
40
50'
38'

(56) References Cited

U.S. PATENT DOCUMENTS 3,512,788 A * 5/1970 Kilbane .................... 277/433
3,565,545 A 2/1971 Bobo et al.
3,638,428 A 2/1972 Shipley et al.
3,768,921 A 10/1973 Brown et al.
3,791,758 A 2/1974 Jenkinson
3,826,084 A 7/1974 Branstrom et al.
3,936,215 A 2/1976 Hoff
3,945,759 A 3/1976 Bobo
3,964,257 A 6/1976 Lardellier
3,979,903 A 9/1976 Hull, Jr. et al.
3,980,411 A 9/1976 Crow
4,060,337 A * 11/1977 Bell, III .................... 416/186 R
4,100,732 A 7/1978 Bryans et al.
4,113,406 A 9/1978 Lee et al.
4,127,988 A 12/1978 Becker
4,156,344 A 5/1979 Cuthbertson et al.
4,236,869 A 12/1980 Laurello
4,248,566 A * 2/1981 Chapman et al. .............. 415/26
4,250,703 A 2/1981 Norris et al.
4,273,512 A 6/1981 Weiler
4,296,599 A 10/1981 Adamson
4,346,860 A 8/1982 Tedstone
4,425,079 A 1/1984 Speak et al.
4,459,802 A * 7/1984 Mowill ....................... 60/772
4,462,204 A 7/1984 Hull
4,463,552 A 8/1984 Monhardt et al.
4,506,502 A 3/1985 Shapiro
4,574,584 A 3/1986 Hovan
4,643,639 A * 2/1987 Caine ........................ 415/148
4,657,482 A 4/1987 Neal
4,715,779 A 12/1987 Suciu
4,807,433 A 2/1989 Maclin et al.
4,881,367 A 11/1989 Flatman
4,901,520 A * 2/1990 Kozak et al. ................. 60/782
4,923,370 A * 5/1990 Larson et al. ................ 416/95
4,981,018 A * 1/1991 Jones et al. ................. 60/726
5,022,817 A 6/1991 O'Halloran
5,044,153 A 9/1991 Mouton
5,106,263 A * 4/1992 Irie ........................... 415/206
5,119,625 A 6/1992 Glowacki
5,123,240 A 6/1992 Frost et al.
5,144,794 A 9/1992 Kirikami et al.
5,155,993 A 10/1992 Baughman et al.
5,174,105 A 12/1992 Hines
5,187,931 A 2/1993 Taylor
5,189,874 A 3/1993 Kreitmeier
5,209,633 A 5/1993 McGreehan et al.
5,209,641 A * 5/1993 Hoglund et al. .......... 416/223 B
5,224,337 A 7/1993 Morishita et al.
5,235,803 A * 8/1993 Rodgers ....................... 60/785
5,236,301 A * 8/1993 Palmer ........................ 415/116
5,253,472 A 10/1993 Dev
5,271,711 A 12/1993 McGreehan et al.
5,279,109 A 1/1994 Liu et al.
5,327,719 A 7/1994 Mazeaud et al.
5,351,478 A 10/1994 Walker et al.
5,454,222 A 10/1995 Dev
5,484,261 A 1/1996 Biscay et al.
5,555,721 A 9/1996 Bourneuf et al.
5,615,997 A * 4/1997 Hoglund et al. ........... 415/169.1
5,680,754 A 10/1997 Giffin et al.
5,857,833 A 1/1999 Dev
6,109,868 A 8/2000 Bulman et al.
6,325,595 B1 * 12/2001 Breeze-Stringfellow et al. ......................... 415/144
6,589,015 B1 7/2003 Roberts et al.
6,899,518 B2 5/2005 Lucas et al.
6,962,479 B2 11/2005 Hubbard
6,976,826 B2 12/2005 Roy et al.
7,182,570 B2 * 2/2007 Favret et al. ................ 415/106
7,517,187 B2 4/2009 Hsu et al.
7,565,796 B2 7/2009 Eleftheriou et al.
7,614,250 B2 * 11/2009 Sanagi ......................... 62/426
7,628,583 B2 12/2009 Roberts et al.
7,644,572 B2 1/2010 Labala
7,717,369 B2 5/2010 Chaniot et al.
8,070,453 B1 * 12/2011 Matheny .................. 416/231 R
8,490,408 B2 * 7/2013 Nichols et al. ................ 60/782
2009/0162190 A1 * 6/2009 Romani et al. .............. 415/115
2009/0257868 A1 * 10/2009 Fonda-Bonardi .......... 415/211.2
2010/0061849 A1 * 3/2010 Visintainer et al. ........... 415/206
2011/0206502 A1 * 8/2011 Rulli et al. .................. 415/177
2012/0036865 A1 * 2/2012 Brillet et al. .................. 60/785
2013/0098061 A1 * 4/2013 Matwey et al. ............... 60/785

FOREIGN PATENT DOCUMENTS

DE 909059 4/1954
DE 1288851 2/1969
DE 2658796 6/1978
EP 0374004 6/1990
GB 624402 6/1949
GB 764018 12/1956
GB 1389347 4/1975
GB 2047815 12/1980
GB 2074655 11/1981

* cited by examiner

CENTRIFUGAL COMPRESSOR WITH BLEED FLOW SPLITTER FOR A GAS TURBINE ENGINE

BACKGROUND

The present disclosure relates to a gas turbine engine and more particularly to a centrifugal compressor.

Centrifugal compressors have a wide variety of industrial and aerospace applications, including gas turbine engines, fluid pumps and air compressors. Oftentimes, a bleed flow is sourced from the centrifugal compressor for auxiliary use. Such a bleed flow may be on the order of 10% which has been heretofore unavailable from a single source point as a bleed flow upstream of the impeller may be too low a pressure for its intended use. A mix of bleed sources—generally sourced upstream and downstream of the impeller—have been effectively utilized but may require a relatively more complicated bleed flow control arrangement.

SUMMARY

An impeller according to an exemplary aspect of the present disclosure includes a plurality of vanes formed around a hub, each of the plurality of vanes defines a flow stream split for removal of flow resulting in an offset in the casing between a leading edge and a trailing edge.

A centrifugal compressor assembly according to an exemplary aspect of the present disclosure includes an impeller with a plurality of vanes formed around a hub which defines an axis of rotation, each of the plurality of vanes defines a flow stream split for removal of flow resulting in an offset in the casing between a leading edge and a trailing edge, the leading edge defines an axial intake and the trailing edge defines a radial exit. An impeller shroud defines a flow splitter which interfaces with the offset in the plurality of impeller vanes to define a mid-impeller bleed location.

A method of providing a bleed flow from a centrifugal compressor according to an exemplary aspect of the present disclosure includes interfacing a flow splitter with an offset in a plurality of impeller vanes to define a mid-impeller bleed.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
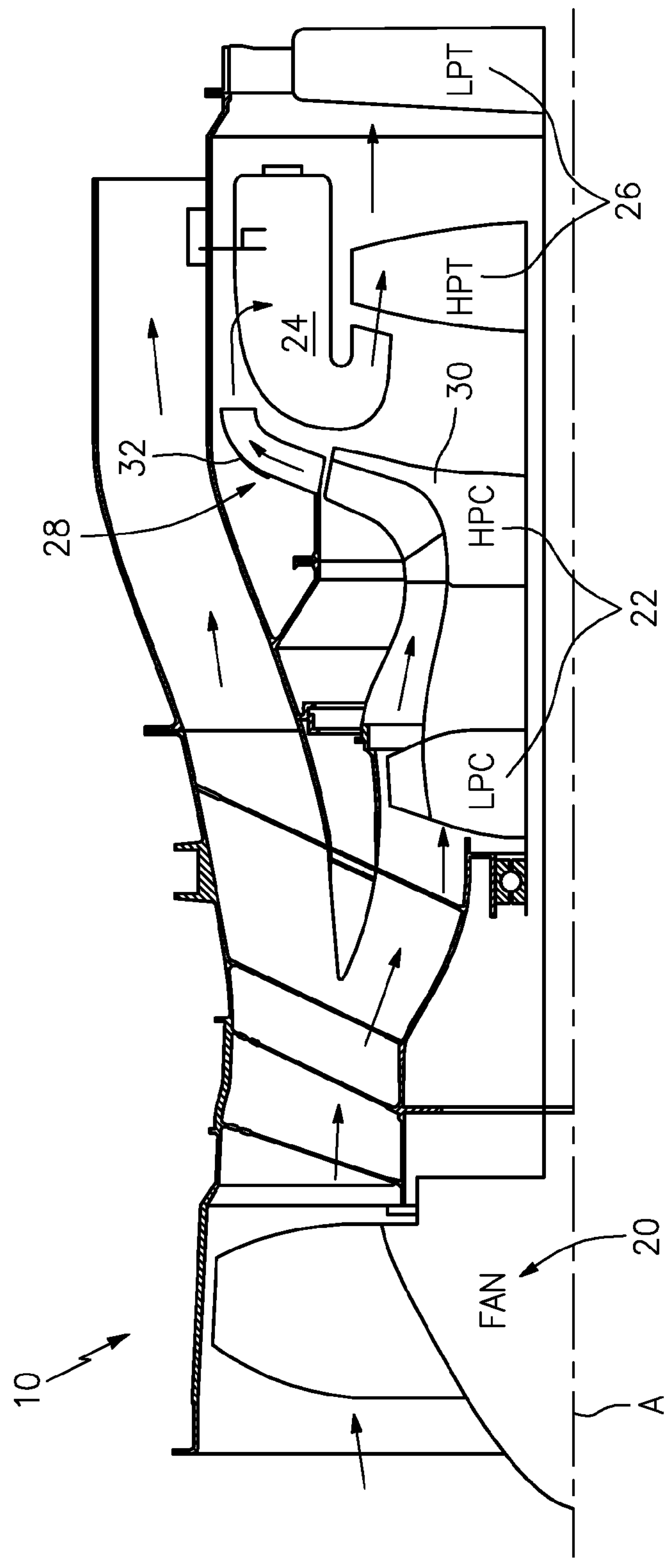
FIG. 1 is a general partial cut-away view of a gas turbine engine having a centrifugal compressor.

FIG. 1 schematically illustrates a generic gas turbine engine 10 that generally includes a fan section 20, a compressor section 22, a combustion portion 24, and a turbine section 26 along axis A. The compressor section 22 includes at least a centrifugal compressor assembly 28. The centrifugal compressor assembly 28 as defined herein generally includes an axial inlet and a radial exit. It should be understood that although a particular gas turbine engine is illustrated in the disclosed non-limiting embodiment, the centrifugal compressor assembly 28 may be utilized within any application having an impeller arrangement to include but not limited to, gas turbines, turbochargers, air conditioning compressors and other such machines.

Figure 2:
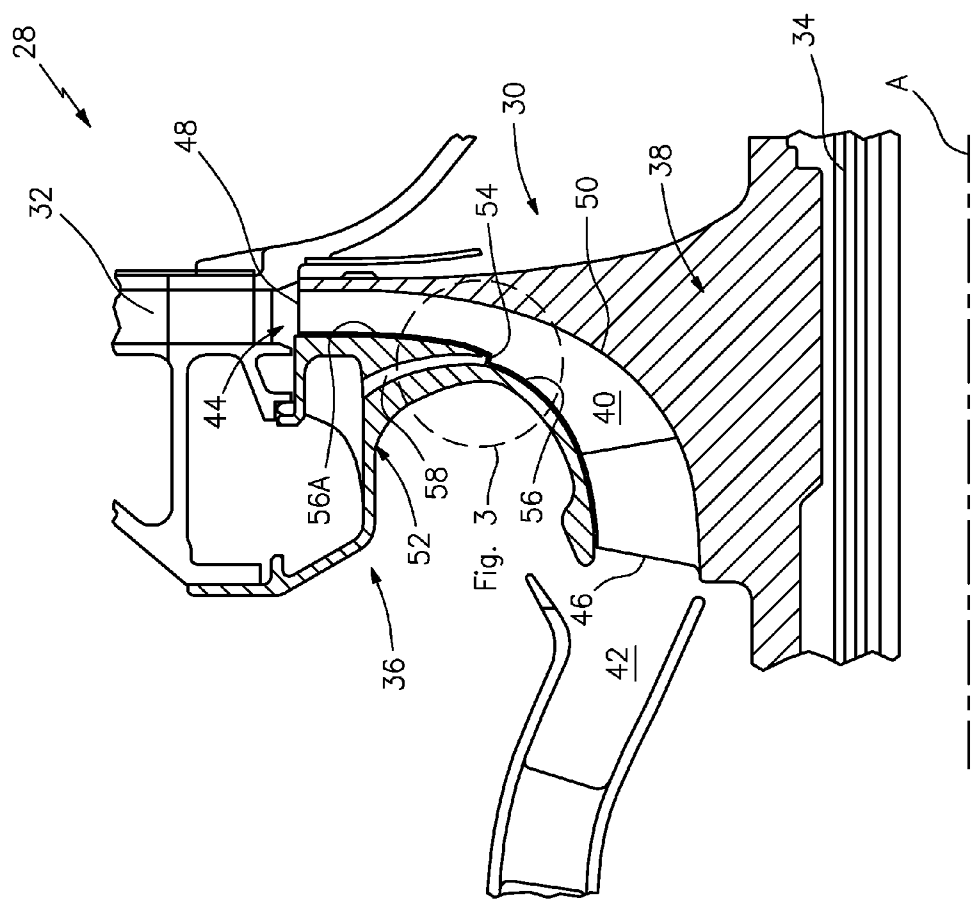
FIG. 2 is an expanded sectional view of a centrifugal compressor according to one non-limiting embodiment.

With reference to FIG. 2, the centrifugal compressor assembly 28 generally includes an impeller 30 and a diffuser 32. The impeller 30, fixed to a central shaft 34, rotates about axis A within a stationary impeller shroud 36 mounted to other static structures. The impeller 30 includes a central hub portion 38 and a plurality of impeller vanes 40 at the radial periphery thereof.

The impeller vanes 40 direct the fluid flow from a generally axial inlet 42 to a generally radial exit 44 to force the flow radially outward and thereby imparts work onto the fluid flow. Fluid enters the impeller 30 at the axial inlet 42 defined by the impeller vanes leading edges 46 and is directed toward an impeller trailing edge 48 which are generally transverse to the leading edges 46. The fluid path through the impeller vane 40 and into the diffuser 32 is defined by the stationary impeller shroud 36 and a curved outer surface 50 of the impeller hub portion 38 between the axial inlet 42 and the radial exit 44.

Figure 3:
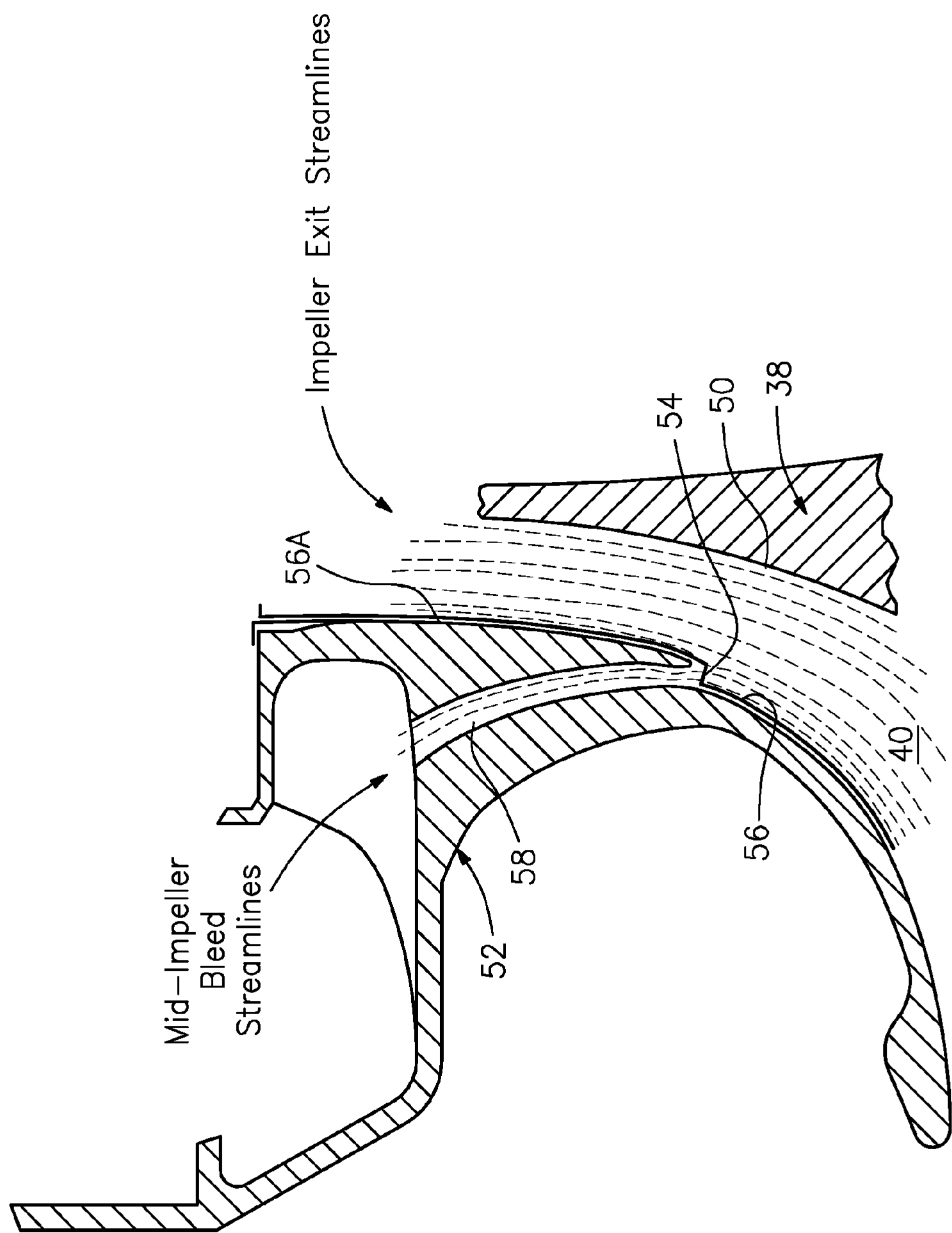
FIG. 3 is an expanded view of the centrifugal compressor which schematically illustrates a bleed flow therefrom.

The stationary impeller shroud 36 includes a flow splitter 52 which interfaces with an offset 54 in the impeller vanes 40 at a location between the leading edge 46 and the trailing edge 48 of the impeller vanes 40 on an axial forward surface 56. The flow splitter 52 closely follows the shape of a radial forward surface 56A downstream of the offset 54. The offset 54 may be a stepped surface at which the impeller vanes steps down to correspond with the flow splitter 52 to define a mid-impeller bleed path 58 which splits from the impeller primary flow to the radial exit 44 (FIG. 3). The flow splitter is so directed so as to remove bleed flow in a manner that is in the same general direction as the main impeller flow. That is, the flow splitter 52 is located to provide a mid-impeller bleed location to efficiently split off bleed flow of a desired quantity. It should be understood that the mid-impeller radial location and the bleed path 58 may be radially defined and positioned to provide the desired bleed pressure and quantity.

Figure 4:
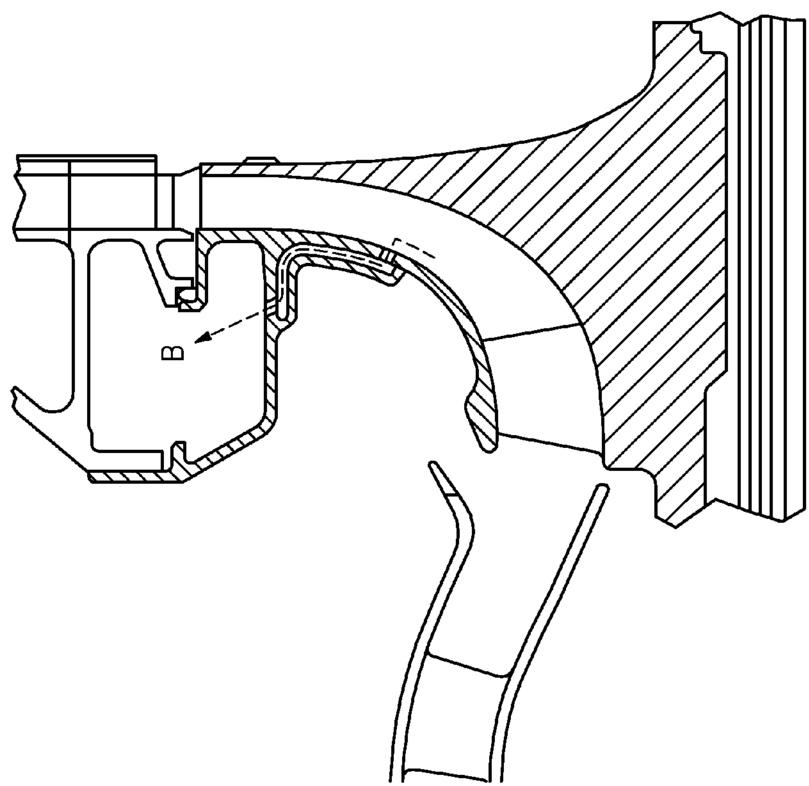
FIG. 4 is an expanded sectional view of a RELATED ART centrifugal compressor.

The flow splitter 52 facilitates an efficient/low-loss bleed recovery system that captures a desired dynamic head imparted into the stream in the forward part of the impeller; the radial outward portion of the impeller is not subjected to the additional detrimental effects of diffusion within the impeller resulting from the removal of the bleed flow; no redesign of the impeller is necessary as only impeller tip machining is changed to accommodate the flow splitter 52 and bleed passage; and the flow splitter lip may be aerodynamically designed with an O give shape to accommodate a significant range of bleed turndown without lip separation to provide, for example, from 1% to 10% bleed flow as compared to a conventional bleed path B (RELATED ART; FIG. 4) which may provide up to an only approximate 1% bleed flow.

Figure 5:
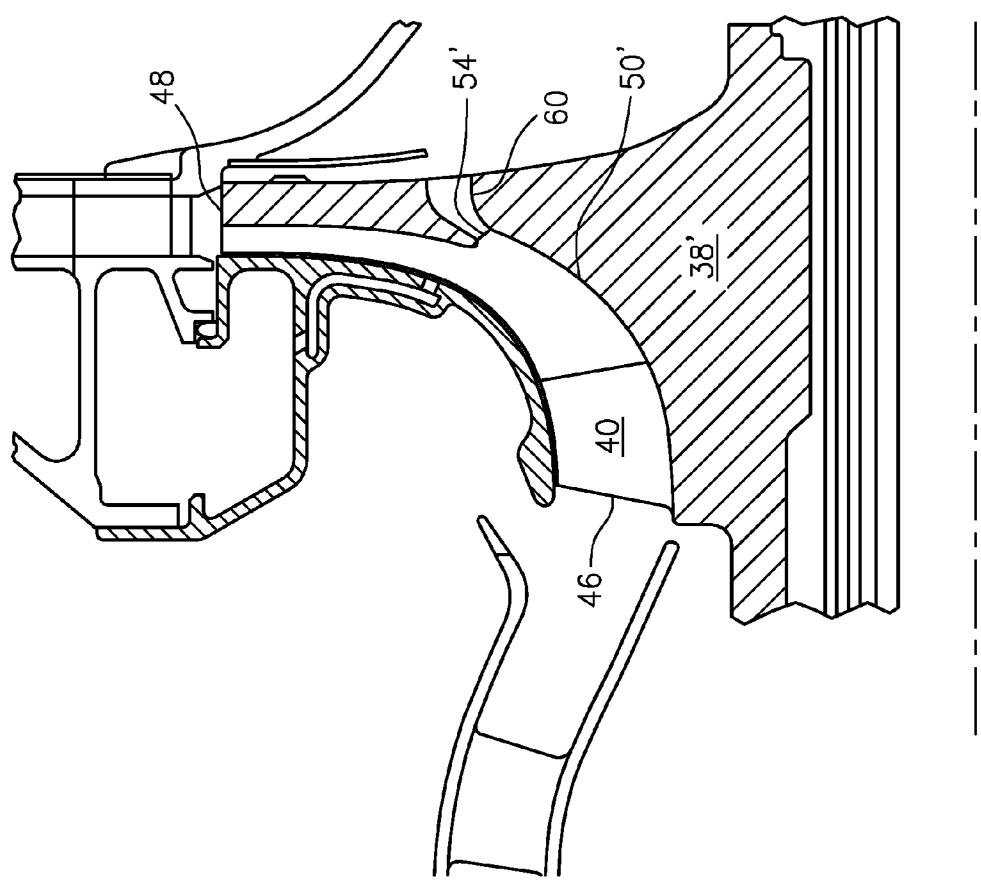
FIG. 5 is an expanded sectional view of a centrifugal compressor according to another non-limiting embodiment.

With reference to FIG. 5, the bleed flow path may alternatively or additionally be communicated through a bleed path 60 through an impeller hub portion 38'. That is, an offset 54' located on an axial aft surface of each of the impeller vanes 40' communicates the mid-impeller bleed flow through the bleed path 60 for further use to efficiently split off bleed flow of a desired quantity. Location of the offset 54' on an axial aft surface of each of the plurality of vanes 40' adjacent to a curved outer surface 50' of the impeller hub portion 38' provides for further control over the desired quantity of mid-impeller bleed flow. It should be understood that the aft mid-impeller radial location and the bleed path 60 may be radially defined and positioned to provide the desired bleed pressure and quantity.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An impeller comprising:

a hub defined about an axis of rotation; and a plurality of vanes formed around said hub, each of said plurality of vanes defines an offset between a leading edge and a trailing edge, wherein said offset defines a stepped surface on an axially forward face of said hub, said hub defines a bleed passage including an inlet port located on said stepped surface that extends to an exit port on an axially aft surface of said hub, said exit port located radially outward from said inlet port, and said bleed passage is configured to direct all of a fluid entering said inlet port through said exit port.

2. The impeller as recited in claim 1, wherein said leading edge defines an axial intake and said trailing edge defines a radial exit.

3. The impeller as recited in claim 1, wherein said exit port is fluidly connected to an inlet port of said bleed passage with a curved section, said inlet port to said bleed passage includes a first cross-sectional area and said exit port includes a second cross-sectional area, said second cross-sectional area being greater than said first cross-sectional area.

4. A centrifugal compressor assembly comprising:

an impeller with a plurality of vanes formed around a hub which defines an axis of rotation, each of said plurality of vanes defines an offset between a leading edge and a trailing edge, said offset defines a stepped surface on said axially forward face of said hub, said leading edge defines an axial intake and said trailing edge defines a radial exit, wherein said hub defines a bleed passage including an inlet port located on said stepped surface that extends to an exit port on an axially aft surface of said hub, said exit port located radially outward from said inlet port, and said bleed passage is configured to direct all of a fluid entering said inlet port through said exit port.

5. The centrifugal compressor assembly as recited in claim 4, wherein said bleed passage splits off from a flow path between said axial intake and said radial exit.

6. A method of providing a bleed flow from a centrifugal compressor comprising:

interfacing a bleed passage with an offset in a plurality of impeller vanes, wherein said offset is located on an axial aft surface of each of said plurality of vanes adjacent a hub and defines a stepped surface on said axially forward face of said hub, said hub defines a bleed passage including an inlet port located on said stepped surface that extends to an exit port on an axially aft surface of said hub, the exit port located radially outward from the inlet port, and said bleed passage is configured to direct all of a fluid entering said inlet port through said exit port.

* * * * *